Figure 1:
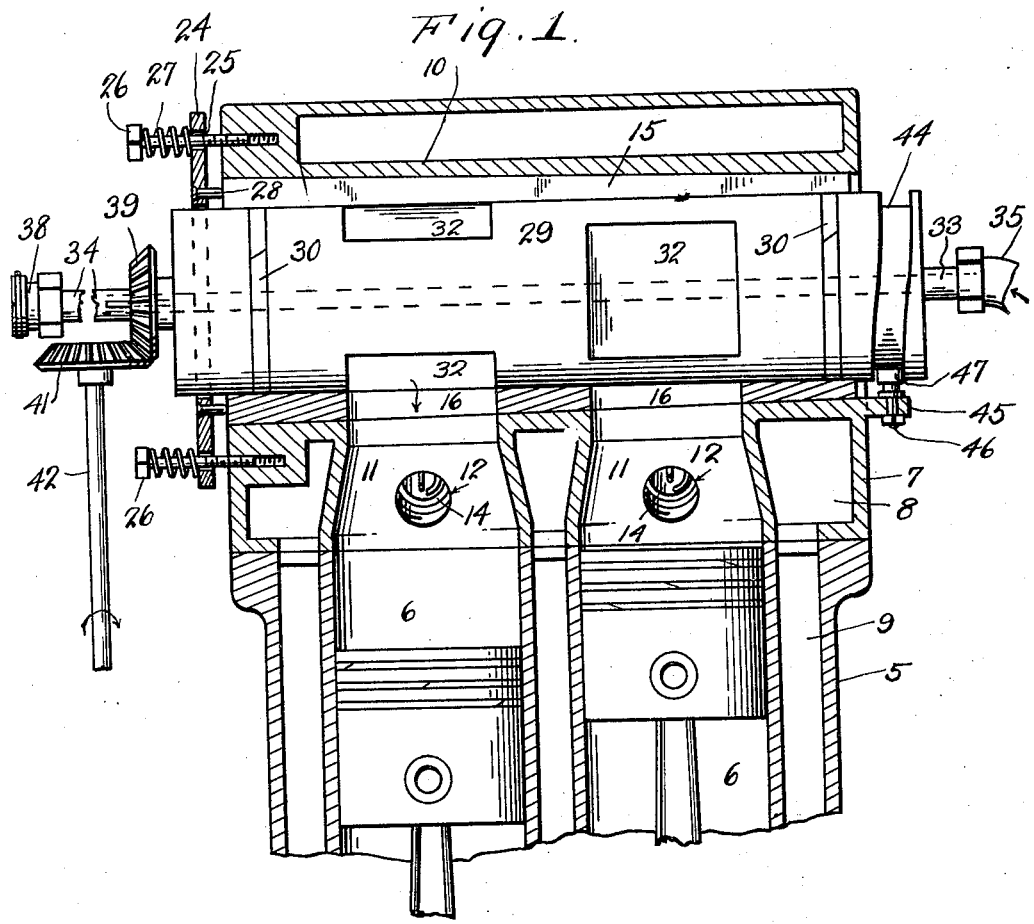

Aug. 13, 1929. F. E. DAVIDSON 1,724,458
ROTARY VALVE FOR HYDROCARBON ENGINES
Filed April 17, 1928    3 Sheets-Sheet 1

Inventor
Frank E. Davidson
By Clarence O'Brien
Attorney

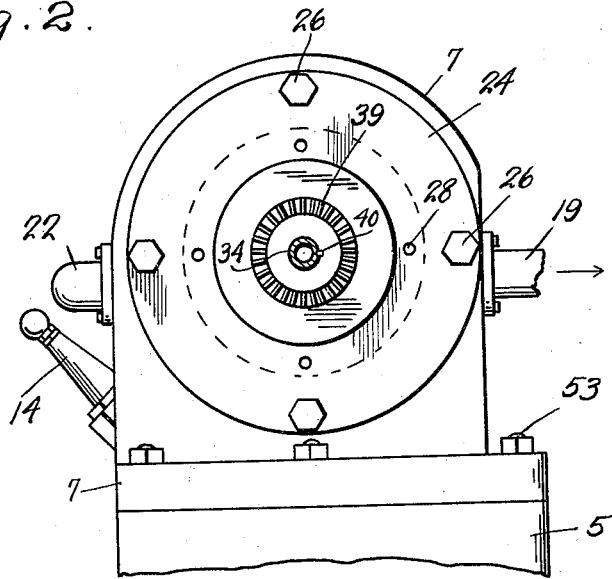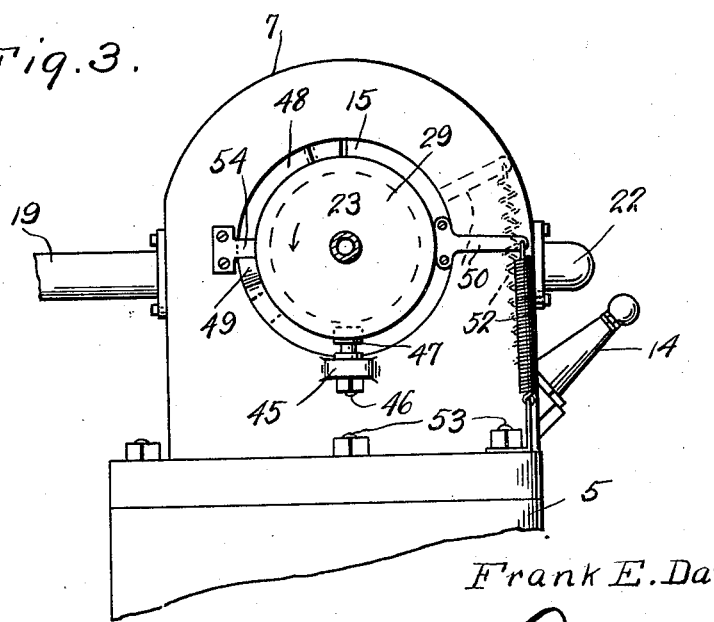

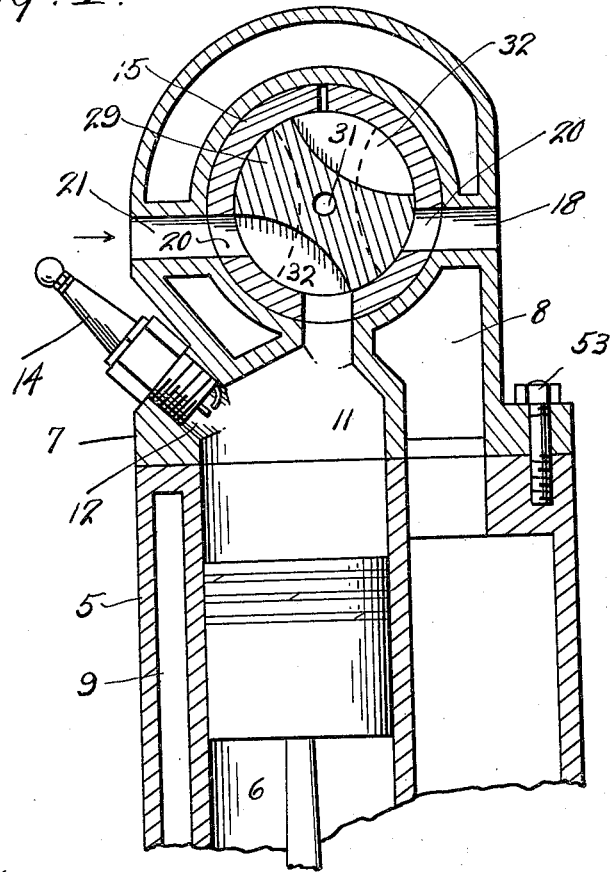
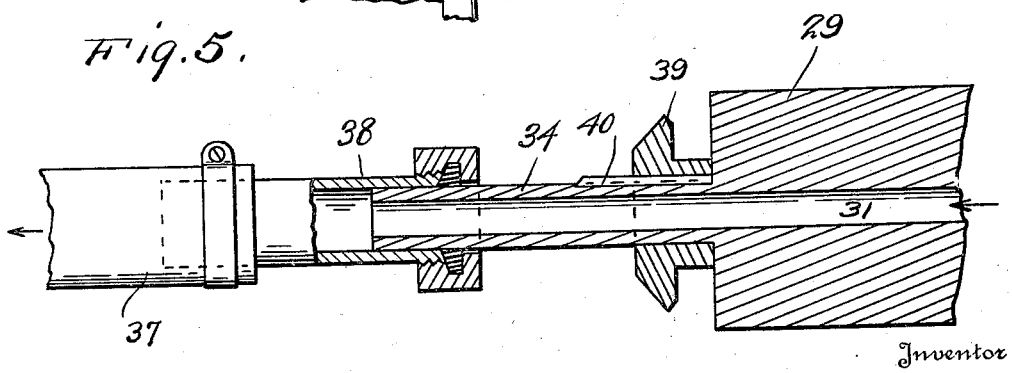

Patented Aug. 13, 1929.

1,724,458

UNITED STATES PATENT OFFICE.

FRANK E. DAVIDSON, OF SAN BERNARDINO, CALIFORNIA.

ROTARY VALVE FOR HYDROCARBON ENGINES.

Application filed April 17, 1928. Serial No. 270,712.

The present invention relates to the valve structure for hydro-carbon engines and has for its prime object to provide a rotary valve rotating on an axis at right angles to the axes of the cylinders and having means associated therewith for imparting a rotary and reciprocating motion to the valve simultaneously.

Another very important object of the invention resides in the provision of a valve structure wherein a rotary valve is mounted for rotation and reciprocation in a slit sleeve the exterior surface of which is tapered and the sleeve being slit and the provision of means urging the sleeve to compensate for any wear in the valve or in the interior of the sleeve.

Another very important feature of the invention resides in the provision of cam means for preventing the tying of the valve and sleeve together which might be caused by the expansion of the valve.

A still further very important object of the invention resides in the provision of a water cooled valve structure of the rotary and reciprocating type wherein the structure is exceedingly simple, inexpensive to manufacture, strong and durable, and thoroughly efficient and reliable in operation.

With the above and numerous other objects in view as will appear as the description proceeds, the invention resides in certain novel features of construction, and in the combination and arrangement of parts as will be hereinafter more fully described and claimed.

Figure 6:
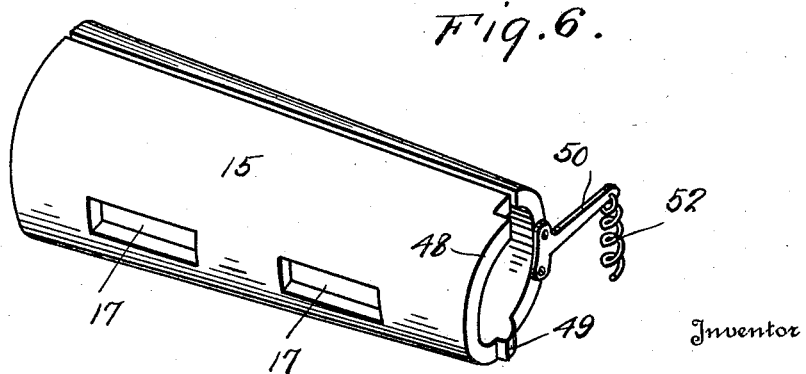

In the drawing:

Figure 1 is a vertical longitudinal section through the head portion of an engine showing my improved valve structure mounted therein, Figure 2 is an end elevation thereof, Figure 3 is another end elevation thereof, Figure 4 is a vertical transverse section therethrough, Figure 5 is an enlarged detail section of one end of the valves and a hollow trunnion coupled with the water circulating hose, and Figure 6 is a perspective view of the wear compensating sleeve.

Referring to the drawing in detail it will be seen that the numeral 5 denotes an engine block having one or more cylinders 6 formed therein. The numeral 7 denotes generally a head which is jacketed as at 8 to communicate with the jacket 9 of the engine block 5 for the proper circulation of water.

This head 7 is provided with a longitudinally extending tapered bore 10 the axis of which is disposed at right angles to the axes of the cylinder 6. The block 7 is provided with firing chambers 11 communicating with the bore 10 and having spark plug openings 12 leading thereinto and into which are threadedly engaged spark plugs 14 so as to extend upwardly and laterally from one side of the head 7 as clearly indicated in Figure 4.

A longitudinally split sleeve 15 is disposed in the tapered bore 10 and the exterior surface of this split sleeve 15 is in the form of a frustrum of a cone that is tapered toward one end while the interior thereof is truly cylindrical. This may be seen best by an inspection of Figure 1.

This sleeve 15 has ports 16 in the bottom thereof registering with the firing chambers 11 and has exhaust ports 17 on one side registering with exhaust ports 18 in the head 7 leading to exhaust manifold 19. On the other side of the sleeve there are provided intake ports 20 registering with intake ports 21 formed in the head 7 and reading from intake manifold 22. The split of the cylinders is disposed uppermost. A ring 24 has openings 25 through which extend bolts 26 which are threaded in one end of the head 7 as is clearly illustrated in Figure 1 and springs 27 are disposed about the bolt 26 and impinge against the head thereof and the ring 24 urges the ring inwardly and this ring is provided with abutment pins 28 engaging the thicker end edge of the sleeve 15 to urge the same in the direction of the bore 10.

A valve 29 has cylindrical formation and is rotatably mounted in the sleeve and has packing rings 30 at the ends thereof. This valve 29 is formed with a longitudinally extending passage 31 and with peripheral notches 32 for bringing into communication ports 16 with ports 17 and 20 to cause proper intake and exhaust of the fuel and burnt gases respectively.

This rotary valve 29 has hollow trunnions 33 and 34 extending from the ends thereof. A hose 35 is engaged by suitable couplings 36 with the trunnions 33 while a hose 37 is engaged by suitable couple links 38 with trunnions 34 to provide a circulation of water through the valve. A bevel gear 39 is splined as at 40 on the trunnion 34 and meshes with a beveled gear 41 on the shaft 42 driven in any suitable manner from the internal combustion engine preferably, of course, from the crank shaft thereof and timed to impart proper rotation to the valve 29 so that the engine will operate on the well known four cycle principle.

It is advisable to have the valve reciprocate while rotating in order to provide even wear and to obtain the maximum thickness. I therefore provide a cam groove 44 in the end of the valve 29 remote from the gear 39 and on an extension 45 I mount an axle 46 with a roller 47 rotatable thereon and engageable in the cam groove 44 so that as the valve rotates the reciprocatory motion will be imparted thereto.

Should the valve expand suddenly there is danger that it might hang in the sleeve 15 and in order to overcome this difficulty I provide the smaller end of the sleeve 15 with a cam 48 starting from a shoulder 49. An arm 50 radiates outwardly from the cam and has a spring 52 anchored thereon and anchored to one of the bolts 53 which engage the head 7 on the block 5 and this spring urges the sleeve to a position which is shown at 49 in abutment with a member 54 on the head 7.

Therefore it will be seen that if the valve picks up the sleeve to cause it to rotate therewith in a counter clockwise direction as indicated in Figure 3 the cam 48 will slide the sleeve away from the member 54 thereby loosening the sleeve on the valve and allowing the spring to return the sleeve to its normal and proper position and of course as the sleeve returns to its normal position it will move back longitudinally because of the springs 27.

From the above detailed description it will be seen that I have devised an exceedingly simple and efficient rotating and reciprocating valve structure having means associated therewith for compensating for any wear and allowing a smooth running of the valve in a perfectly reliable manner. The valve is furthermore cooled by the circulation of water as is the head thereby minimizing the expansion to the head.

It is thought the construction, operation and advantages of this invention will now be quite apparent to those skilled in this art without a more detailed description thereof. The present embodiment of the invention has been disclosed in detail merely by way of example since in actual practice it attains the features of advantage enumerated as desirable in the statement of the invention and the above description. It will be apparent that changes in details of construction, and in the combination and arrangement of parts may be resorted to without departing from the spirit or scope of the invention as hereinafter claimed or sacrificing any of its advantages.

Having thus described my invention, what I claim as new is:

1. In an engine structure, a head having a longitudinally tapered bore, a split sleeve mounted in the bore having its interior cylindrical and its exterior frusto-conical, spring means associated with the sleeve urging it in the direction of the taper, a rotary cylindrical valve in the sleeve.

2. In an engine structure, a head having a longitudinally tapered bore, a split sleeve mounted in the bore having its interior cylindrical and its exterior frusto-conical, spring means associated with the sleeve urging it in the direction of the taper, a rotary cylindrical valve in the sleeve, the smaller end of the sleeve having a cam, a member engaged with the cam, a shoulder on said end of the sleeve, an arm extending from the sleeve, a spring engaged with the arm and normally holding the shoulder in abutment with the member whereby should the valve expand to pick up the sleeve for rotation said sleeve will be moved against the first mentioned spring means so as to release itself from the valve.

3. In an engine structure, a head having a longitudinally tapered bore, a split sleeve mounted in the bore having its interior cylindrical and its exterior frusto-conical, spring means associated with the sleeve urging it in the direction of the taper, a rotary cylindrical valve in the sleeve, the smaller end of the sleeve having a cam, a member engaged with the cam, a shoulder on said end of the sleeve, an arm extending from the sleeve, a spring engaged with the arm and normally holding the shoulder in abutment with the member whereby should the valve expand to pick up the sleeve for rotation said sleeve will be moved against the first mentioned spring means so as to release itself from the valve, means for simultaneously rotating and reciprocating the valve.

In testimony whereof I affix my signature.

FRANK E. DAVIDSON.